US012549208B2

(12) United States Patent
Tomabechi

(10) Patent No.: US 12,549,208 B2
(45) Date of Patent: Feb. 10, 2026

(54) COMMUNICATION APPARATUS

(71) Applicant: CANON KABUSHIKI KAISHA, Tokyo (JP)

(72) Inventor: Masaru Tomabechi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 460 days.

(21) Appl. No.: 18/176,254

(22) Filed: Feb. 28, 2023

(65) Prior Publication Data

US 2023/0291423 A1 Sep. 14, 2023

(30) Foreign Application Priority Data

Mar. 10, 2022 (JP) ................. 2022-037603

(51) Int. Cl.
*H04B 1/04* (2006.01)
*H01P 1/24* (2006.01)
*H01P 3/08* (2006.01)

(52) U.S. Cl.
CPC ............. *H04B 1/0475* (2013.01); *H01P 1/24* (2013.01); *H01P 3/081* (2013.01)

(58) Field of Classification Search
CPC ......... H04B 1/0475; H01P 1/24; H01P 1/268; H01P 3/026; H01P 3/081; H01P 3/00
See application file for complete search history.

(56) References Cited

U.S. PATENT DOCUMENTS

| 2018/0090806 A1* | 3/2018 | Katz | ................. H01P 3/02 |
| 2021/0210442 A1* | 7/2021 | Dalmia | ............. H01L 23/49838 |
| 2021/0409013 A1* | 12/2021 | Eguchi | ................... H01P 1/061 |

FOREIGN PATENT DOCUMENTS

| JP | H08224232 A | 9/1996 |
| JP | 2020048068 | * 3/2020 |

* cited by examiner

*Primary Examiner* — Timothy X Pham
(74) *Attorney, Agent, or Firm* — Canon U.S.A., Inc., IP Division

(57) ABSTRACT

A communication apparatus includes a transmission path arranged on a substrate, a signal source connected to an input portion of the transmission path, a metal member configured to function as a ground portion for the transmission path and having a space between the metal member and the transmission path, and a termination circuit configured to terminate the transmission path, wherein the termination circuit is arranged on a surface of the substrate on which the metal member is arranged.

10 Claims, 5 Drawing Sheets

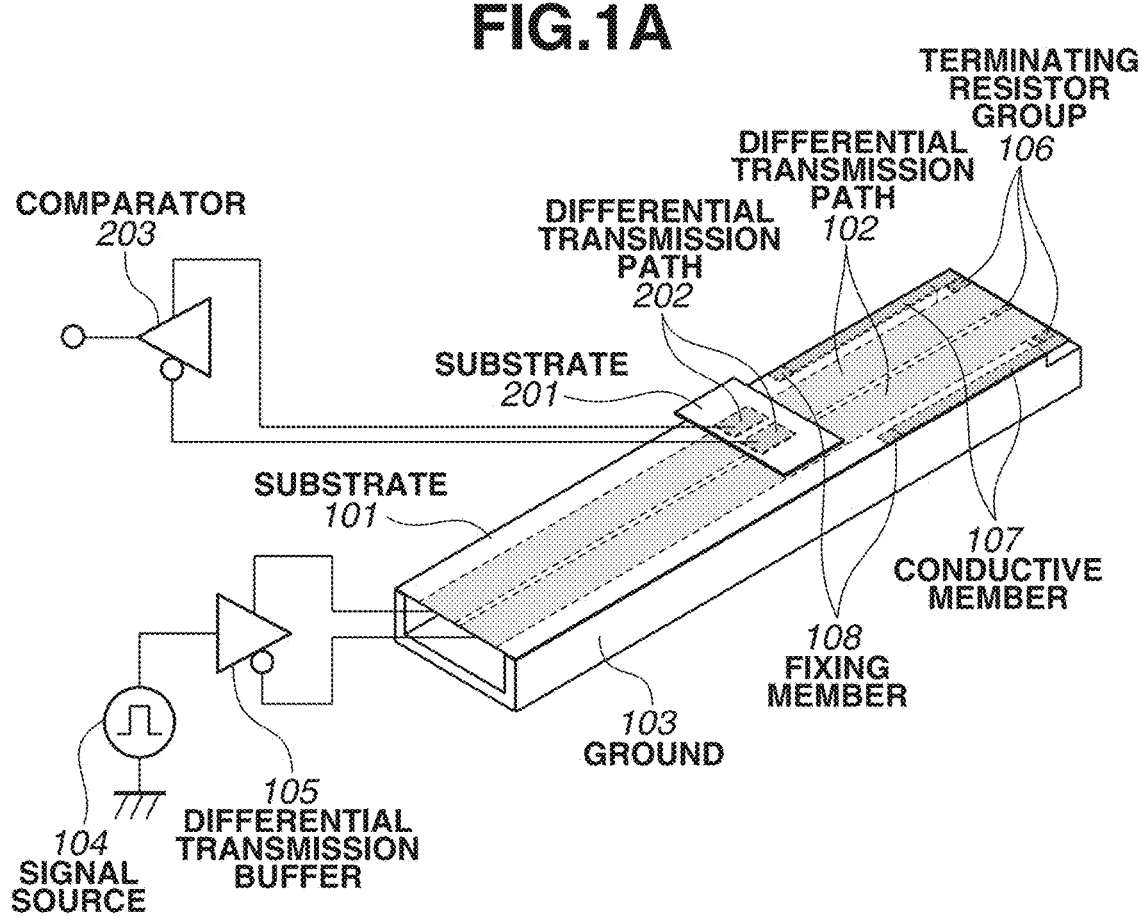
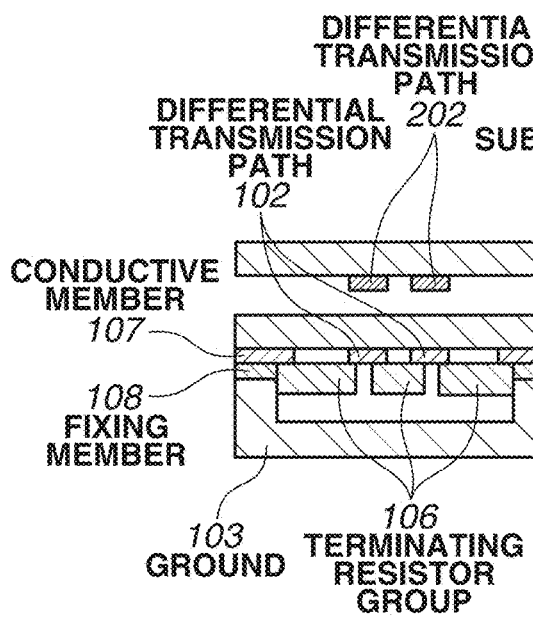
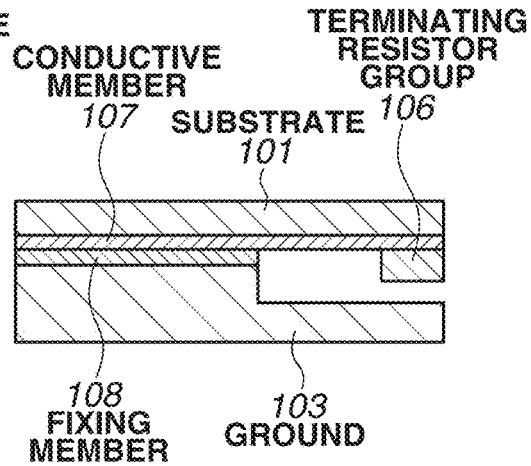

FIG.5

| g [mm] | INTERFERENCE CHARACTERISTIC WHEN d = 30 [dB] | TRANSMISSION CHARACTERISTIC WHEN d = 0 [dB] |
|---|---|---|
| 0.1 | -61 | -40 |
| 0.5 | -68 | -39 |
| 1.5 | -74 | -39 |
| 3 | -78 | -39 |

COMMUNICATION APPARATUS

BACKGROUND

Field of the Disclosure

The present disclosure relates to a wireless communication technology.

Description of the Related Art

Recently, the number of systems that perform data communications at high speed between a moving portion that operates mechanically and a fixed portion by mounting an apparatus for communicating data to a manufacturing system or a robot has increased. For example, Japanese Patent Application Laid-open No. 8-224232 discusses a data communication between a rotational frame and a fixed frame by wirelessly connecting a transmission path of the rotational frame and a coupler of the fixed frame.

In the wireless communication system, there is a case in which one end of the transmission path is connected to a signal source, and the other end of the transmission path is terminated with a resistor having an impedance approximately equal to a characteristic impedance of the transmission path. In this case, noise is sometimes caused in the transmission path due to the disorder of the characteristic impedance.

SUMMARY

Thus, the present disclosure is directed to a technique capable of reducing the noise in the wireless communication system.

According to an aspect of the present disclosure, a communication apparatus includes a transmission path arranged on a substrate, a signal source connected to an input portion of the transmission path, a metal member configured to function as a ground portion for the transmission path and having a space between the metal member and the transmission path, and a termination circuit configured to terminate the transmission path, wherein the termination circuit is arranged on a surface of the substrate on which the metal member is arranged.

Further features of the present disclosure will become apparent from the following description of embodiments with reference to the attached drawings.

BRIEF DESCRIPTION OF THE DRAWINGS

FIGS. 1A, 1B, and 1C are diagrams illustrating a termination configuration of a transmission path according to a first embodiment.

FIG. 5 is a table illustrating a change of an interference characteristic depending on a distance between the transmission paths according to the second embodiment.

DESCRIPTION OF THE EMBODIMENTS

Figure 2:
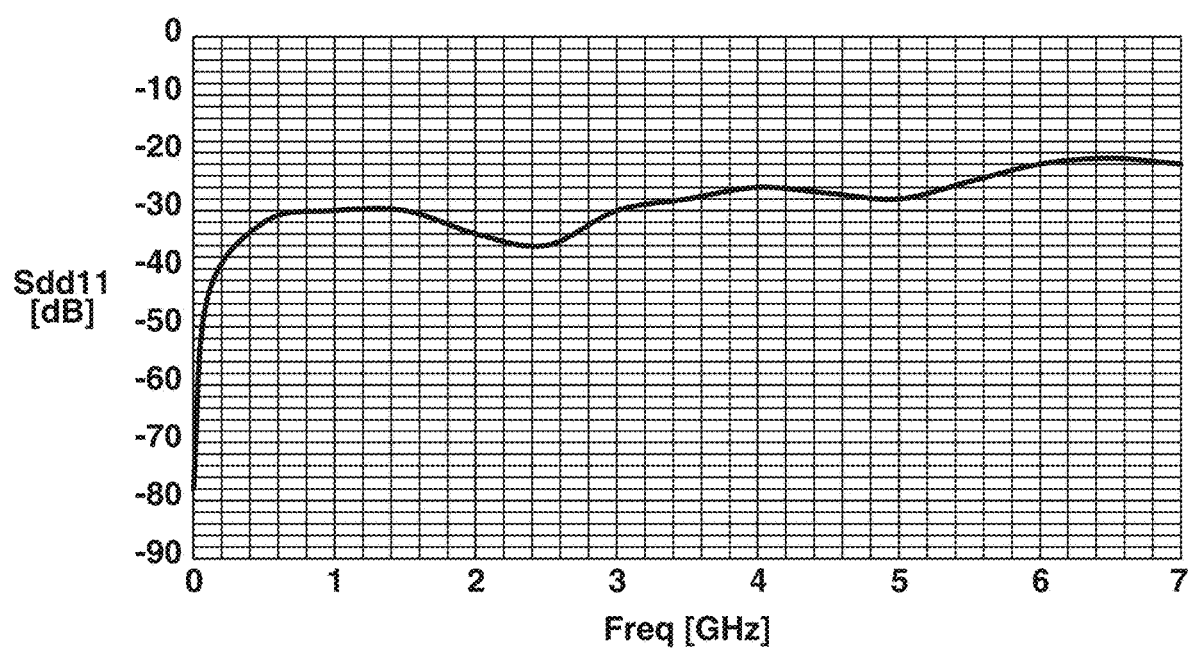
FIG. 2 is a graph illustrating a reflection characteristic of the transmission path according to the first embodiment.

Exemplary embodiments of the present disclosure will be described with reference to the attached drawings. Note that the following embodiments are not necessarily intended to limit the disclosure, and that all the combinations of the features described in the following embodiments are not necessarily essential.

FIGS. 1A, 1B, and 1C are diagrams illustrating a termination configuration of a transmission path included in a communication apparatus according to a first embodiment.

First, with reference to FIGS. 1A, 1B, and 1C, a description will be given of a non-contact communication method performed between a transmission path on a substrate having a space between the transmission path and a metal member serving as a ground, and a transmission path on another substrate, and a termination method of the transmission path. In FIGS. 1A and 1B, a differential transmission path 102, including two linear conductive members (transmission lines) arranged side by side on a substrate 101 is a transmission path that transmits a signal through a non-contact communication to a differential transmission path 202 on a substrate 201. The differential transmission path 102 is included in a differential microstrip transmission path. The substrate 101 is a single-sided flexible substrate on which a copper foil is arranged on a ground (metal) 103 side thereof. By using the single-sided flexible substrate, it is possible to eliminate factors causing the disorder of impedance, such as via-holes, and to achieve a terminating configuration of the transmission path with low cost. In general, the flexible substrate is formed of a base material having an insulation property, such as polyimide, a coverlay, and a copper foil. A signal output from a signal source 104 is input to the differential transmission path 102 as a differential signal via a differential transmission buffer 105 connected to one end (input end) of the differential transmission path 102.

The ground 103 is arranged to have a space between the ground 103 and the differential transmission path 102, and functions as a reference potential portion for the transmission side differential transmission path 102. Assume that the width of the space between the ground 103 and the differential transmission path 102 is 9 mm and that the height of the space is 3 mm. The differential impedance of the differential transmission path 102 changes depending on the size of the space and the configuration of the substrate 101. If the differential impedance of the differential transmission path 102 is defined as a "$Z_{dif}$", the "$Z_{dif}$" can be derived by the following equation (1).

$$Z_{dif} = 2Z_o\left(1 - 0.48e^{-0.9\frac{s}{h}}\right) \quad (1)$$

A characteristic impedance "Zo" for each transmission path can be derived from the following equation (2).

$$z_o = -\frac{60}{\sqrt{0.475\varepsilon_r + 0.67}}\ln\left(\frac{4h}{0.67(0.8L + t)}\right) \quad (2)$$

In the equations (1) and (2), "e" is a Napier's constant, "S" is a distance between the transmission lines in the differential transmission path 102, "h" is a distance from the differential transmission path 102 to the ground 103, "$\varepsilon_r$" is a dielectric constant in a space from the differential transmission path 102 to the ground 103, "L" is a copper foil width of the transmission line, and "t" is a copper foil thickness of the transmission line.

In the present embodiment, the differential impedance "$Z_{dif}$" is set to 100Ω, "S" is set to 0.5 mm, "h" is set to 3 mm, "$\varepsilon_r$" is set to 1.0, "L" is set to 3.3 mm, and "t" is set to 0.035 mm.

The differential transmission path 202 is a reception side transmission path that moves along the differential transmission path 102, and receives a signal from the transmission side differential transmission path 102 through a non-contact communication. More specifically, the signal output from one end of the differential transmission path 102 is received by the differential transmission path 202 through the non-contact communication, and is detected as a received signal after being subjected to a waveform shaping by a comparator 203. The differential transmission path 102 performs the non-contact communication, through an electromagnetic field connection, with the differential transmission path 202 facing a surface of the substrate 101 opposite to a surface on which the ground 103 is arranged.

In the present embodiment, each of the transmission paths is a differential microstrip transmission path, but the configuration of the transmission path is not limited to the differential microstrip transmission path. For example, the receiving side transmission path 202 may be a capacitive transmission path with an open end, or an inductive transmission path with a short-circuited end. Further, each of the transmission paths may be a single-end transmission path. In the present embodiment, the differential transmission path 102 functions as a transmitting transmission path for transmitting a signal, and the differential transmission path 202 functions as a receiving transmission path for receiving the signal. However, the directional coupler formed of the transmitting transmission path and the receiving transmission path has a reversibility. Thus, by switching a circuit connected to the differential transmission path 102 and a circuit connected to the differential transmission path 202, the transmitting side and the receiving side can be switched.

A termination resistor group 106 is arranged on a surface of the substrate 101 on which the ground 103 is arranged. Because the termination resistor group 106 and the substrate 201 do not contact each other by arranging the termination resistor group 106 on the ground 103 side, the non-contact communication can be achieved without constraints on a near distance between the substrate 101 and the substrate 201 over all the area in a moving direction of the differential transmission path 202. The copper foil portion of the substrate 101 is exposed by removing the coverlay on the substrate 101 near the termination resistor group 106, so that the termination resistor group 106 can be mounted. In the present embodiment, the termination resistor group 106 includes three resistors of a first resistor, a second resistor, and a third resistor, and terminates the differential transmission path 102. The first resistor is a resistor for connecting one of the transmission lines of the differential transmission path 102 and a conductive member 107, and the second resistor is a resistor for connecting the other one of the transmission lines of the differential transmission path 102 and the conductive member 107. The third resistor is a resistor for connecting the transmission lines of the differential transmission path 102 to each other.

The conductive member 107 is formed of, for example, a copper foil or a solder formed on the substrate 101. The conductive member 107 conducts to the ground 103 via a fixing member 108. The fixing member 108 is a fixing tool such as, an electrically conductive adhesive, an electrically conductive tape, a solder, and a screw. The fixing member 108 is provided to improve the conductivity between one end of the resistor and the ground 103. For this reason, the fixing member 108 needs not be provided in a case where the conductivity can be secured by, for example, directly connecting the terminals of the termination resistor group 106 and the ground 103 using solder. The conduction method is not limited to the above-described method as long as the ground 103 can function as a reference potential portion with respect to the differential transmission path 102.

As illustrated in FIG. 1C, a cutout can be provided in the ground 103 near the termination resistor group 106. By providing the cutout, it is possible to prevent the termination resistor group 106 and the ground 103 from contacting each other in a case where the termination resistor group 106 is mounted on the substrate 101 in a shifted state or in a case where the substrate 101 is fixed in a state shifted in a lateral direction. By preventing the termination resistor group 106 and the ground 103 from contacting each other, it is possible to prevent the substrate 101 from floating from the ground 103, and to stabilize the impedance of the differential transmission path 102. In this way, it is possible to reduce the reflection characteristic deterioration with respect to the geometric tolerance for the mounting shift and the fixing shift of the substrate 101.

The constant values of the termination resistor group 106 are desirably set to match with the differential impedance of the differential transmission path 102 and the common mode impedance. In a case where the differential impedance of the differential transmission path 102 is 100Ω, the common mode impedance is approximately 60Ω. In this case, it is desirable to set the value of the third resistor that connects the transmission lines to 180Ω and to set the other resistance values to approximately 120Ω. A reflection characteristic of the differential transmission path 102 in this case with a differential transmission buffer 109 being as a reference in a simulation is illustrated in FIG. 2. The horizontal axis indicates frequency, and the vertical axis indicates a reflection characteristic with the signal source 104 being as a reference. It can be seen from FIG. 2 that a reflection characteristic lower than or equal to −20 db at each frequency is obtained. The length of the differential transmission path 102 is 50 mm, and the characteristic impedance of the signal source 104 is made to coincide with the impedance of the differential transmission path 102.

Figure 3A:
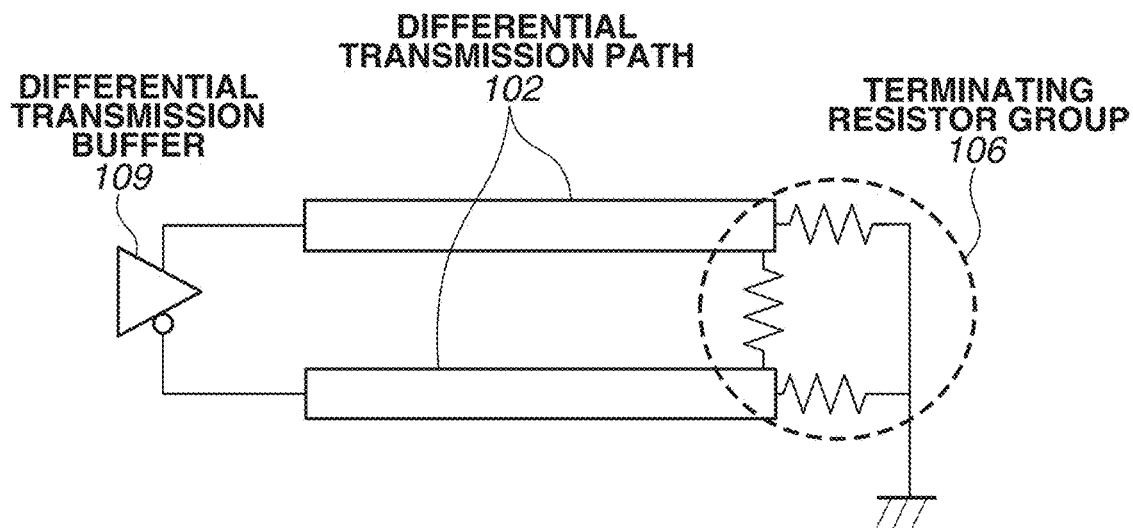
FIGS. 3A, 3B, and 3C are diagrams each illustrating a circuit configuration of a termination end of the transmission path according to the first embodiment.
Figure 3B:
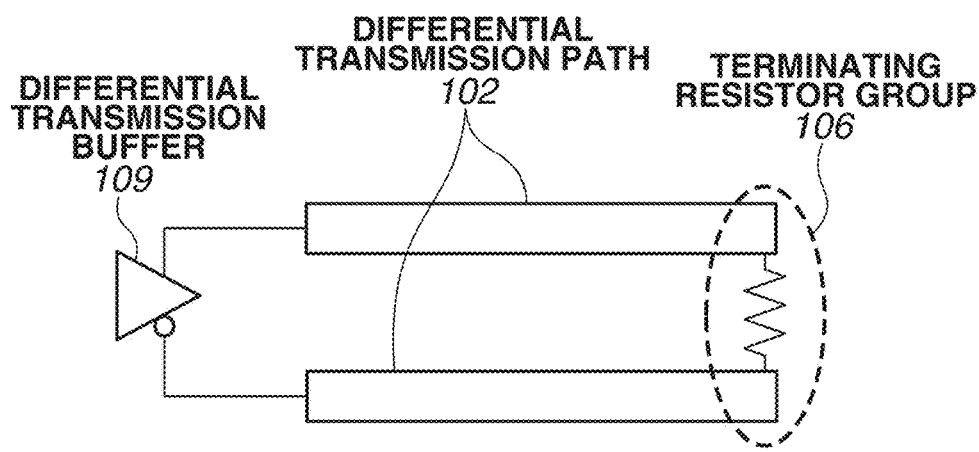
Figure 3C:
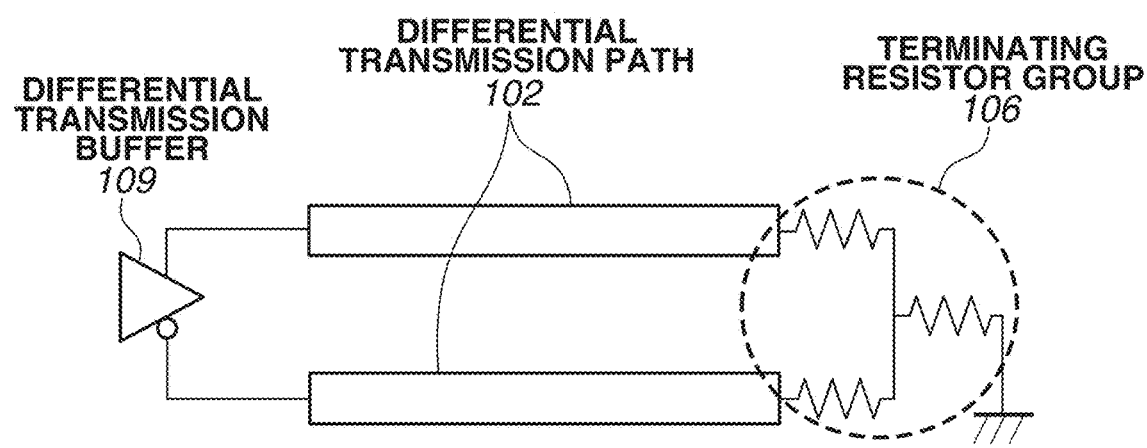

The circuit including the resistor between the transmission lines and between each of the transmission lines and the ground as illustrated in FIG. 3A is described. However, each circuit may be formed of a plurality of resistors, or may be configured to include no resistors. For example, the termination circuits illustrated in FIGS. 3B and 3C may be employed. The circuit including these resistors can be set by a user based on the required cost, considering the signal bandwidth required for the non-contact communication and/or the assembleability. By arranging the termination resistor group 106 on the ground 103 side on the surface of the substrate 101, it is possible to achieve the termination configuration that can reduce the reflection noise in the differential transmission path 102 with a simple configuration.

A communication system including the communication apparatus according to the present embodiment can be applied to, for example, an ink jet printer including a print head unit and a main body as communication units or a robot performing a slide movement.

In the first embodiment, the termination configuration of the differential transmission path 102 arranged on the linear substrate is described. Next, a configuration of differential transmission paths included in a communication apparatus according to a second embodiment will be described. Portions of the second embodiment different from the first embodiment will be mainly described.

The termination configurations of the differential transmission paths according to the second embodiment is different from that of the first embodiment in that termination portions face each other and that signals output from two signal sources are respectively input to differential transmission paths 302 and 402. The shape of the substrate may be a hollow circular ring, a hollow square, or a hollow pentagon, as long as the substrate has a hollow shape and the termination portions face each other.

Figure 4:
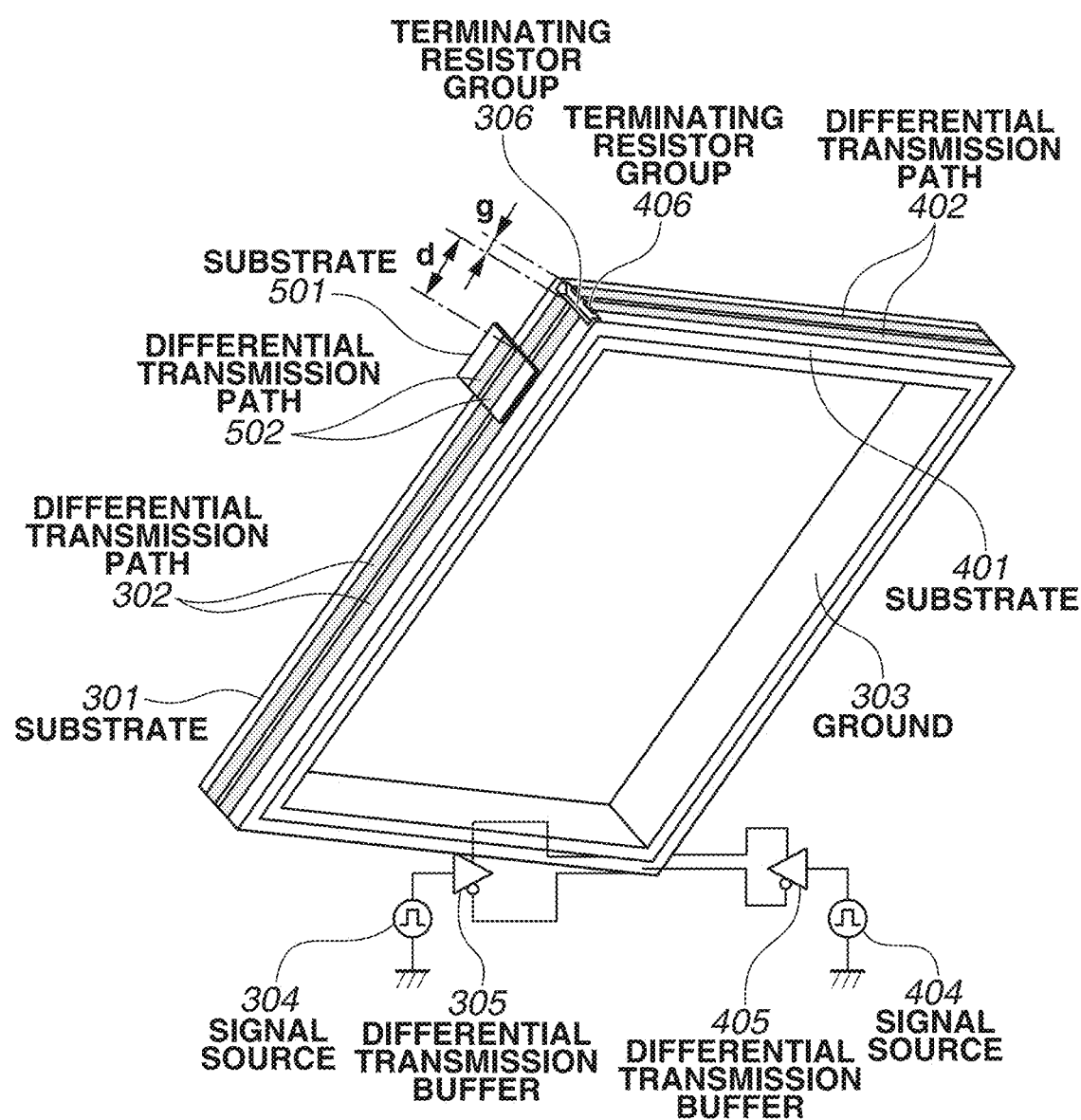
FIG. 4 is a diagram illustrating a termination configuration of each transmission path according to a second embodiment.

FIG. 4 is a diagram illustrating the termination configuration of each of the differential transmission paths 302 and 402 included in the communication apparatus according to the second embodiment.

The communication apparatus according the present embodiment includes a substrate 301 and a substrate 401. The substrate 301 includes a differential transmission path 302 including two linear conductive members arranged in parallel. The substrate 401 includes a differential transmission path 402. The substrate 301 and the substrate 401 form transmission side differential transmission paths 302 and 402 to transmit signals through a non-contact communication to a differential transmission path 502 on a substrate 501. The two substrates need not be independent substrates, and may be integrated. A ground 303 included in the communication apparatus according to the present embodiment is arranged to have a space between the ground 303 and the above-described differential transmission paths 302 and 402, and functions as a reference potential portion for the differential transmission paths 302 and 402. In the present embodiment, the shape of the ground 303 is a hollow square, but may not be a hollow square as long as the distances of the differential transmission paths 302 and 402 to a surface having a reference potential are constant. The signals output from a signal source 304 and a signal source 404 are input to the differential transmission paths 302 and 402 as differential signals via a differential transmission buffer 305 and a differential transmission buffer 405 connected to end sides of the differential transmission paths 302 and 402, respectively. In the present embodiment, a case where the communication apparatus includes two signal sources 304 and 404 and two differential transmission paths 302 and 402 will be described, but the communication apparatus may include more than two signal sources and two differential transmission paths. Further, the signal source may be one and input a signal to each of the differential transmission paths 302 and 402 using a distributor. A termination register group 306 and a termination register group 406 are arranged on the ground 303 side of the surfaces of the substrates 301 and the 401 to terminate the differential transmission paths 302 and 402, respectively.

The length of each of the differential transmission paths 302 and 402 included in the communication apparatus according to the present embodiment is set to 50 mm in lengthwise direction, and a distance g between the termination portions of the differential transmission paths 302 and 402 is set to 1.5 mm. A distance from an end of the differential transmission path included in the communication apparatus to the differential transmission path included in another communication apparatus in a height direction is set to 1.5 mm. A distance "d" from the termination portion to the substrate included in the other communication apparatus in a circumferential direction is set to 30 mm, and a length of a differential transmission path included in the other communication apparatus is set to 3 mm, and the width of the differential transmission path included in the other communication apparatus is set to 1.6 mm.

FIG. 5 illustrates a transmission characteristic of interference noise generated from a signal source at a frequency of 5 GHz in a case where the distance "d" is set to 30 mm and the distance "g" between the differential transmission paths 302 and 402 is varied. FIG. 5 also illustrates a transmission characteristic at a frequency of 5 GHz in a case where the distance "d" is set to 0 mm and the distance "g" between the differential transmission paths 302 and 402 is varied. As illustrated in FIG. 5, the transmission characteristic of the interference noise varies depending on the distance "g" between the differential transmission paths 302 and 402, but the transmission characteristic is affected little. Thus, by appropriately setting the distance g between the differential transmission paths 302 and 402, it is possible to reduce only the interference noise while keeping the transmission characteristic. In this way, in the configuration in which the signal is branched into two or more directions and the termination portions face each other, it is possible to achieve the termination configuration capable of reducing the interference noise generated at each termination portion, with a simple configuration.

The communication system including the communication apparatus according to the present embodiment is applicable to, for example, a network camera including a pan head or an image capturing unit as a communication unit, or a robot arm including a hand portion or an arm portion as a communication unit.

While the present disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of priority from Japanese Patent Application No. 2022-037603, filed Mar. 10, 2022, which is hereby incorporated by reference herein in its entirety.

What is claimed is:
1. A communication apparatus comprising:
a transmission path including two paths configured to be on a single-sided flexible substrate;
a signal source configured to transmit or receive a differential signal and connected to an input portion of the transmission path;
a metal member configured to function as a ground portion for the transmission path, and arranged in such a way that a part of the metal member and is separated from the single-sided flexible substrate;
a termination circuit configured to terminate the transmission path and including a plurality of resistors; and
a conductive member configured to be on the single-sided flexible substrate,
wherein a first resistor and a second resistor of the plurality of resistors are arranged on a surface of the single-sided flexible substrate on which the metal member is arranged, and the first resistor and the second resistor are connected to the conductive member configured to be on the single-sided flexible substrate, and
wherein a third resistor of the plurality of resistors is arranged on the surface of the substrate on which the metal member is arranged, and the third resistor is further arranged between the two paths configured to be on the single-sided flexible substrate.

2. The communication apparatus according to claim 1, wherein the transmission path is a differential transmission path.

3. The communication apparatus according to claim 1, wherein the transmission path is branched into two or more directions, and termination portions of the branched transmission paths face each other.

4. The communication apparatus according to claim 1, wherein the transmission path performs non-contact communication, through an electromagnetic field coupling, with another transmission path facing a surface of the substrate opposite to the surface of the substrate on which the metal member is arranged.

5. The communication apparatus according to claim 1, wherein the member conducting to the metal member is formed of at least one of a metal, a fixing tool, an electrically conductive adhesive, and an electrically conductive tape.

6. A communication apparatus comprising:
a transmission path including a path configured to be on a single-sided flexible substrate;
a circuit connected to one end of the transmission path and configured to transmit or receive a differential signal;
a metal member configured to function as a ground portion for the transmission path, and arranged in such a way that a part of the metal member is separated from the single-sided flexible substrate;
a resistor connected to an end of the transmission path and arranged on the single-sided flexible substrate; and
a conductive member configured to be on the single-sided flexible substrate and connected to the resistor,
wherein the metal member includes a cutout in a vicinity of the resistor.

7. The communication apparatus according to claim 6, wherein the transmission path is a differential transmission path.

8. The communication apparatus according to claim 6, wherein the conductive member is electrically connected to the metal member by using a fixing member.

9. The communication apparatus according to claim 8, wherein the fixing member includes a fixing tool.

10. The communication apparatus according to claim 8, wherein the transmission path includes two paths, and another resistor is arranged between the two path.

* * * * *